United States Patent [19]

Li

[11] 4,073,655

[45] Feb. 14, 1978

[54] GLASSES, THERMALLY STABLE HIGH (BETA)-CRISTOBALITE GLASS-CERAMICS AND METHOD

[75] Inventor: Chi-Tang Li, Toledo, Ohio

[73] Assignee: Owens-Illinois, Inc., Toledo, Ohio

[21] Appl. No.: 784,209

[22] Filed: Apr. 4, 1977

Related U.S. Application Data

[60] Division of Ser. No. 734,911, Oct. 22, 1976, which is a continuation-in-part of Ser. No. 320,788, Jan. 3, 1973, abandoned.

[51] Int. Cl.$^2$ ............... C03C 3/04; C03C 3/10; C03C 3/22
[52] U.S. Cl. .................................. 106/52; 106/53; 106/39.6; 106/39.7
[58] Field of Search ............... 106/53, 39.6, 39.7, 106/53

[56] References Cited

U.S. PATENT DOCUMENTS

| | | | |
|---|---|---|---|
| 2,920,971 | 1/1960 | Stookey | 106/39.6 X |
| 3,445,252 | 5/1969 | MacDowell | 106/39.7 |

FOREIGN PATENT DOCUMENTS

| | | | |
|---|---|---|---|
| 1,474,487 | 2/1967 | France | 106/39.6 |
| 1,133,010 | 11/1968 | United Kingdom | 106/39.6 |

*Primary Examiner*—Winston A. Douglas
*Assistant Examiner*—Mark Bell
*Attorney, Agent, or Firm*—Charles S. Lynch; E. J. Holler

[57] ABSTRACT

Thermally stable high (beta)-cristobalite glass-ceramics suitable for making articles such as refractory linings for ovens, furnaces, and the like and which do not undergo transition to the low (alpha)-cristobalite crystal phases upon cooling of the ceramic to ambient temperature. A method for making such stable ceramics by melting a glass of the composition $MO.Al_2O_3.nSiO_2$ wherein the ($Al_2O_3$/MO) molar ratio is 1, MO is CaO or a mixture of CaO and MxO where Mx is a cation of the first, second or fourth group of the Periodic Table or iron and n is a positive number of from 8 to 37, and subjecting the glass to a heat schedule sufficient to form a stabilized high (beta)-cristobalite type crystal structure in the resulting glass-ceramic, with or without a portion of low cristobalite and/or feldspar crystals.

13 Claims, No Drawings

GLASSES, THERMALLY STABLE HIGH (BETA)-CRISTOBALITE GLASS-CERAMICS AND METHOD

This application is a division of application Ser. No. 734,911 filed Oct. 22, 1976 which is a continuation-in-part of application Ser. No. 320,788, filed Jan. 3, 1973, now abandoned.

BACKGROUND OF THE INVENTION

It is known that high cristobalite, also referred to as beta-cristobalite, is one of the best refractories available for use in ovens and furnaces where the temperatures encountered are well-above 1,000° C and up to 1,500° C, due to its low coefficient of thermal expansion.

Silica brick is the refractory commercially available and it usually contains a mixture of low (alpha)-cristobalite other low temperature forms of $SiO_2$, including quartz and tridymite, residual glass and some anorthite. When the silica brick refractory is in place as a lining material for a furnace, and is subjected to temperatures up to 1,500° C, substantially all of the other forms of silica are converted over a period of time to the high cristobalite crystal phase. However, when the furnace is shut down for repairs or other reasons and the high cristobalite-containing-silica brick is cooled to ambient temperatures, an inversion of the high-cristobalite to low-critobalite occurs when the brick is cooled below 200°–275° C. Low cristobalite has a higher coefficient of thermal expansion than high cristobalite. This inversion to low-cristobalite produces a change in the volume and symmetry of the high cristobalite, which change results in spalling and cracking of the silica brick, rendering it unusable as a furnace lining. Such bricks must be replaced before the furnace can be fired up again.

The inversion of high (beta)-cristobalite to the low (alpha)-form upon cooling to below about 200° C is recognized in U.S. Pat. No. 3,445,252 and three approaches for eliminating this undesirable inversion are discussed therein. The first is to eliminate or substantially inhibit the growth of cristobalite-type crystals by adding minor amounts of $Na_2O$, $K_2O$, $Rb_2O$, $Cs_2O$, CaO, SrO, BaO, $La_2O_3$ and/or $P_2O_5$ to the glass melt such that the crystallization formed was essentially all mullite ($3Al_2O_3.2SiO_2$). The second approach is to promote the growth of low-crystobalite-type crystals upon the heat treatment of $Al_2O_3$-$SiO_2$ glasses by the addition thereto of at least 0.5% but no more than about 3% by weight of $Li_2O$. The third approach is the addition of at least 1% but not more than 5% by weight total of CaO, CuO or SrO to the $Al_2O_3$-$SiO_2$ glasses to stabilize the high-cristobalite-type present with the mullite crystals. The patentee does not disclose a highly essential feature of the compositions of the present invention, namely that the ratio of moles of CaO (or CaO plus certain other oxides, explained hereafter) to $Al_2O_3$ is essentially 1. The highest molar ratios of CaO to $Al_2O_3$ in the examples of Table I of the patent are 0.44 (Example 22) and 0.34 (Example 6). Moreover, U.S. Pat. No. 3,445,252 does not teach the art how to make a glass-ceramic having stabilized high-cristobalite not containing mullite or such a glass-ceramic having over 50% and particularly at least about 70% and higher high-cristobalite solid solution crystal phase. The glass-ceramics obtained by following the teaching of the patent contain a mixture of high-cristobalite or low-cristobalite with other crystal phases. The high-crystobalite glass-ceramic products described therein always contain mullite. Moreover, according to U.S. Pat. No. 3,445,252, the alkali metal oxides such as $Na_2O$, $K_2O$, $Rb_2O$ and $Cs_2O$ tend to inhibit the growth of the cristobalite derivatives and thus it is recommended to leave them out of the cristobalite compositions. As will be described below with respect to the present invention, CaO is present, in certain critical amounts, to produce stabilized high-crystobalite solid solutions and part of the CaO may be replaced by a metal oxide $M_2O$, where M is a cation of the first group of the Periodic Table, which includes Li, Na, K, Rb and Cs. Use of such CaO and $M_2O$ produces results, i.e., stabilized high-cristobalite solid solutions, which results are contrary to those one would expect from the disclosure in U.S. Pat. No. 3,445,252.

SUMMARY OF THE INVENTION

A glass-ceramic article, such as refractory brick, which contains stabilized high-cristobalite solid solution and may contain one or both of feldspar and low cristobalite which high cristobalite is thermally stable and will not invert to low-cristobalite when cooled from a temperature above 1,000° C to ambient temperature, nor crack or spall, is produced by first making a glass melt having the composition of the formula:

$$MO \cdot Al_2O_3 \cdot nSiO_2$$

wherein
a. the molar ratio of ($Al_2O_3$/MO) is 1,
b. MO is CaO or a mixture of CaO plus another metal oxide wherein the metal is selected from iron or the first, second and fourth groups of the Periodic Table and the molar ratio of CaO to such other metal oxide is from 4:1 to 1:3,
c. n is a number of from 8–37 and then heat treating the glass to thermally in situ crystallize the stabilized high-cristobalite solid solution. Within the described compositions it is usually preferred that n be a positive number of at least about 14 or higher because such compositions can be heat treated to yield glass-ceramics having over 50 weight percent high-cristobalite solid solution(ss) phase. When the glass-ceramic products of the invention contain other crystal phases these comprise one or both of low cristobalite solid solution and a feldspar and all products of the invention are essentially free from mullite. The usually most preferred compositions have n in the range from 21–29, since such ratios promote the formation of a high percentage of the stabilized high-cristobalite solid solution phase.

DESCRIPTION OF THE INVENTION

It has been found that a refractory brick suitable for use in a furnace at a temperature of up to about 1250° C and which consists predominantly, in fact at least about 70% and preferably at least about 90% or more, of stabilized high-cristobalite solid solution and most preferably consists substantially completely of stabilized high-cristobalite solid solution, can be thermally in situ crystallized from a thermally crystallized glass having the composition $CaO \cdot Al_2O_3 \cdot nSiO_2$ wherein the molar ratio of CaO to $Al_2O_3$ is 1 and n is a number from about 21 to about 29.

Table 1 sets forth examples of glass compositions coming within the scope of the invention.

TABLE I

| Ingredients | Examples (Weight Percent) | | | |
|---|---|---|---|---|
| | 1 | 2 | 3 | 4 |
| $SiO_2$ | 89.9 | 90.5 | 89.3 | 91.6 |
| $Al_2O_3$ | 6.5 | 6.1 | 6.9 | 5.4 |
| CaO | 3.6 | 3.4 | 3.8 | 3.0 |
| n | 23.6 | 25 | 22 | 28.7 |

The batch ingredients CaO, $Al_2O_3$ and $SiO_2$ were melted in open crucibles of 90% Pt-10% Rh alloy at a temperature of about 3200° F for 100 hours. Due to the highly viscous nature of the glass, the long melting time, instead of stirring, is used to ensure homogeneity. The crucibles were then water quenched to room temperature and the glass was then crushed into a powder of under 100 mesh. The glass powder was wrapped with platinum foil and put into a furnace for the heat treating schedules set forth in Table A. After the heat treatment the sintered powder was ground again and subjected to X-ray phase analysis. The heat treatment and the phase assemblage for each stabilized high-cristobalite composition are listed in Table A. Based upon the X-ray analysis, the stabilized high-cristobalite compositions contain, in addition to high-cristobalite solid solution(ss), no, or a small amount, of low-cristobalite solid solution, no, or a trace amount of feldspar (anorthite) and a very small amount of residual glass. The weight percentage of each phase is estimated by measuring the area of a selected reflection which is specified in the following table with a single phase, using a planimeter for such measurement:

| | hkl* | 2 θ** | d(A)*** |
|---|---|---|---|
| high-cristobalite solid solution | 331 | 56.2 | 1.64 |
| low-cristobalite solid solution | 102 | 31.4 | 2.85 |
| anorthite | 220 | 27.9 | 3.20 |

*hkl indices of a reflection from a set of parallel planes
**2 θa Bragg powder diffraction angle. Cu-radiation was used.
***d(A) interplanar spacing in A unit.

The net X-ray peak intensity of reflection 331 is used to estimate the weight percentage of the high-cristobaltie solid solution intensity in this application.

Each stabilized high-cristobalite was analyzed by the Philips X-ray powder diffractometer. To insure a good relative comparison among all cristobalite compositions, the same amount of material was used for each composition in the X-ray analysis, as reported in Tables A-D, inclusive, infra.

TABLE A

Phase Assemblages of the Stabilized High-Cristobalite

| Ex. No. | Heat Treatment (° C - Hours) | Phase Assemblages (Weight Percentage) | | | |
|---|---|---|---|---|---|
| | | High Cristo-balite | Low Cristo-balite | Feldspar | Glass |
| 1 | 1050–48 | 77 | 11 | 6 | 6 |
| 1 | 1150–48 | 85 | 8 | 7 | 0 |
| 1 | 1250–48 | 84 | 6 | 10 | 0 |
| 1 | 1350–48 | 73 | 18 | — | 9 |
| 2 | 1050–48 | 94 | — | 3 | 3 |
| 2 | 1150–48 | 95 | — | 4 | 1 |
| 2 | 1250–48 | 93 | — | 7 | 0 |
| 2 | 1350–24 | 76 | 10 | 10 | 4 |
| 3 | 1250–48 | 90 | — | 10 | 0 |
| 3 | 1350–48 | 73 | 13 | 9 | 5 |
| 4 | 1050–48 | 78 | — | — | 22 |
| 4 | 1250–48 | 95 | — | 5 | 0 |
| 4 | 1350–48 | 80 | 15 | — | 5 |

From Table A it can be seen that the glass-ceramics formed from the $CaO \cdot Al_2O_3 \cdot nSiO_2$ compositions of Table I are predominantly stabilized high-cristobalite solid solution with a minor amount of low-cristobalite and, in some examples, no low-cristobalite. Feldspar (anorthite), if present, is also in very small amounts, as is the residual glass.

The CaO is essential in the glass composition in order to make the stable high-cristobalite solid solution of the invention. Also critical is the molar ratio of CaO to $Al_2O_3$. Such ratio must be 1 to 1 although a slight excess of $Al_2O_3$ up to a CaO to $Al_2O_3$ molar ratio of about 0.95 to 1 may be practical to use. Cristobalite ($SiO_2$) is a framework type silicate, i.e., each oxygen is coordinated to two si-tetrahedra. In the stabilized high-cristobalite solid solution, part of Si is replaced by Al white Ca or Ca plus other cations are used to make up the charge difference between $Al^{3+}$ and $Si^{3+}$. Theoretically, the molar ratio of $CaO/Al_2O_3$ or $(CaO + M_xO)/Al_2O_3$ has to be 1 in order to accomplish an exact charge-balance. If some additional cations are brought in as impurities by the raw materials, the molar ratio of $CaO/Al_2O_3$ or $(CaO + M_xO)/Al_2O_3$ should be kept slightly less than 1. If such molar ratio is not kept, residual glass and/or other crystalline phases are likely to occur.

It has also been found that a thermally stable cristobalite refractory can also be formed if a portion of the CaO is replaced by a metal oxide wherein the metal cation is iron or is from the first, second, or fourth group of the Periodic Table. The molar ratio of the CaO to such metal oxide should be from 4 to 1 to 1 to 3. Of course, the ratio of CaO plus such other metal oxide to $Al_2O_3$ is 1 or essentially about 1, i.e., 0.95 to 1 as explained above. The moles of silica which may be present are such that n is a positive number of from 8 to 37.

Table II sets forth examples of thermally crystallizable glasses wherein a portion of the CaO is replaced by BaO in the molar ratio shown in the table.

TABLE II

| Ingredients | Examples (Weight Percent) | | | | | | | |
|---|---|---|---|---|---|---|---|---|
| | 5 | 6 | 7 | 8 | 9 | 10 | 11 | 12 |
| $SiO_2$ | 72.2 | 74.4 | 81.5 | 82.2 | 83.7 | 85.9 | 88.2 | 90.4 |
| $Al_2O_3$ | 12.3 | 12.6 | 9.9 | 10 | 8.7 | 7.5 | 6.3 | 5.1 |
| CaO | 1.7 | 3.5 | 3.6 | 4.1 | 3.2 | 2.8 | 2.3 | 1.9 |
| BaO | 13.8 | 9.5 | 5 | 3.7 | 4.4 | 3.8 | 3.2 | 2.6 |
| n | 10 | 10 | 14 | 14 | 16.3 | 19.3 | 23.6 | 30 |
| CaO/BaO (molar ratio) | ½ | 1 | 2 | 3 | 2 | 2 | 2 | 2 |

Glasses of the invention wherein the other metal oxide, referred to as MO, where M is a cation of the second group of the Periodic Table, which group includes Sr, Mg, Be, Ba, Cu, Zn, Cd, etc., are set forth in Table III.

TABLE III

| Ingredients | Examples (Weight Percent) | | | | | | | |
|---|---|---|---|---|---|---|---|---|
| | 13 | 14 | 15 | 16 | 17 | 18 | 19 | 20 |
| $SiO_2$ | 89.1 | 88.6 | 90.8 | 90.3 | 89.4 | 90.6 | 89.5 | 89.5 |
| $Al_2O_3$ | 6.4 | 6.4 | 5.4 | 6.5 | 6.4 | 6.5 | 6.4 | 6.4 |
| CaO | 2.3 | 2.3 | 2 | 2.4 | 2.9 | 2.4 | 2.4 | 2.4 |
| SrO | 2.2 | — | 1.8 | — | 1.3 | — | — | — |
| CdO | — | 2.7 | — | — | — | — | — | — |
| MgO | — | — | — | 0.8 | — | — | — | — |
| BeO | — | — | — | — | — | 0.5 | — | — |
| ZnO | — | — | — | — | — | — | 1.7 | — |
| CuO | — | — | — | — | — | — | — | 1.7 |
| n | 23.6 | 23.6 | 28.7 | 23.6 | 23.6 | 23.6 | 23.6 | 23.6 |
| CaO/MO (Molar ratio) | 2 | 2 | 2 | 2 | 4 | 2 | 2 | 2 |

The glasses of Tables II and III were formed from the raw batch ingredients in accordance with the method described above with respect to the Table I glasses. The heat treatment and the phase assemblage for most of the stabilized high cristobalite glass-ceramics made from the Tables II and III glasses are set forth in the following Table B.

TABLE B

| Ex. No. | Heat Treatment (° C - Hours) | Phase Assemblages (Weight Percentage) | | | |
|---|---|---|---|---|---|
| | | High Cristo-balite | Low Cristo-balite | Feldspar | Glass |
| 5 | 1100 – 72 | Present* | Present* | | |
| 6 | 1100 – 24 | 29 | 5 | 33 | 33 |
| 6 | 1100 – 72 | 35 | 7 | 33 | 25 |
| 7 | 1050 – 72 | 55 | — | 40 | 5 |
| 7 | 1150 – 72 | 48 | 16 | 31 | 5 |
| 7 | 1250 – 96 | 32 | 15 | 16 | 37 |
| 7 | 1350 – 72 | 31 | 13 | — | 56 |
| 8 | 1050 – 72 | 54 | — | 41 | 5 |
| 8 | 1150 – 72 | 60 | 5 | 30 | 5 |
| 8 | 1250 – 96 | 60 | 16 | 16 | 8 |
| 8 | 1350 – 72 | 31 | 16 | — | 53 |
| 9 | 1030 – 48 | 32 | — | — | 68 |
| 9 | 1150 – 24 | 60 | 8 | 27 | 5 |
| 9 | 1250 – 24 | 47 | 13 | 22 | 18 |
| 9 | 1350 – 24 | 35 | 18 | — | 47 |
| 10 | 1030 – 48 | 52 | — | — | 48 |
| 11 | 1050 – 48 | 70 | 5 | 5 | 20 |
| 11 | 1150 – 48 | 64 | 15 | 16 | 5 |
| 11 | 1250 – 48 | 56 | 25 | — | 19 |
| 11 | 1350 – 24 | 47 | 31 | — | 22 |
| 12 | 1050 – 48 | 56 | — | — | 44 |
| 12 | 1150 – 48 | 66 | 19 | 10 | 5 |
| 13 | 1050 – 48 | 85 | — | 5 | 10 |
| 13 | 1150 – 48 | 90 | — | 10 | 0 |
| 13 | 1250 – 48 | 80 | 7 | 13 | 0 |
| 13 | 1350 – 24 | 48 | 28 | — | 24 |
| 14 | 1050 – 48 | 76 | — | 10 | 14 |
| 14 | 1250 – 48 | 75 | 8 | 12 | 5 |
| 15 | 1050 – 48 | 79 | — | 4 | 17 |
| 15 | 1150 – 48 | 89 | — | 10 | 1 |
| 15 | 1250 – 48 | 85 | 3 | 12 | 0 |
| 15 | 1350 – 24 | 63 | 30 | — | 7 |
| 16 | 1050 – 48 | 76 | — | 15 | 4 |
| 16 | 1150 – 48 | 80 | 5 | 10 | 0 |
| 16 | 1250 – 48 | 60 | 25 | 13 | 0 |
| 17 | 1050 – 48 | 87 | — | 3 | 10 |
| 17 | 1250 – 54 | 86 | — | 14 | 0 |
| 18 | 1050 – 48 | 83 | — | 12 | 5 |
| 18 | 1250 – 48 | 57 | 33 | 10 | 0 |
| 19 | 1050 – 54 | 79 | 21 | — | 0 |
| 19 | 1250 – 48 | 81 | 7 | 12 | 0 |
| 20 | 1050 – 48 | 89 | — | — | 11 |
| 20 | 1250 – 48 | 74 | 6 | 15 | 5 |

*detected by Guinier X-ray film method

As in Table A, the weight percentage of each phase is estimated by measuring the area of a selected reflection, as determined by X-ray analysis.

The amount of the stabilized high-cristobalite is found to change with the radius of the second interstitial cation. In general, the smaller the size difference between Ca and the second interstitial cation, the more intense the stabilized high-cristobalite becomes. The net X-ray peak intensity of reflection 331 is used to estimate the high-cristobalite weight percentage. The intensity of stabilized high-cristobalite usually decreases with increasing temperature.

Once the second interstitial cation is selected for the CaO-containing compositions, there are still two ways to increase the intensity of the stabilized high-cristobalite solid solution, namely (1) optimizing the molar ratio between Ca and the second interstitial cation and (2) optimizing the silica concentration, i.e., the $n$-value. When only the ratio of Ca over M (the second interstitial cation) is varied, usually the intensity of high-cristobalite is directly proportional with such ratio. If only the $n$-value of the $SiO_2$ is to be varied, the optimum $n$ is found to be between 21 and 29.

While the amount of $SiO_2$ present in the glass is from 8 to 37 moles, the value of $n$ defined above, the preferred amount is when $n$ is a positive number of at least about 14, usually from about 14 to about 30 and most preferably from 22 to 29. When $n$ is from about 8 up to about 14, it is more difficult to obtain substantially all high-cristobalite solid solution to form without the formation of some small amount of low-cristobalite solid solution and a greater amount of residual glass remaining in the final product than in the products formed with $SiO_2$ wherein $n$ is at least about 14, usually from about 14 to about 30. When $n$ is from about 22 up to about 29, the greatest amount of high-cristobalite solid solution formation occurs at specific temperatures and times, as exemplified in Table B, with a consequent negligible, if any, low-cristobalite or feldspar formation. From the examples and the foregoing discussion, it will be an easy matter for one skilled in the glass-ceramic art to determine the optimum heat treatment conditions for thermally in situ crystallizing the thermally crystallizable glass to form essentially all stabilized high-cristobalite crystals in the final products.

It has also been found that when CaO is substituted by iron oxide or a metal oxide having a cation of the 4th Group of the Periodic Table, which includes Ti, Zr and Hf cations, good stabilized high-cristobalite glass-ceramics are obtained. Representative examples of thermally crystallizable glass compositions suitable for thermal in situ crystallization to glass-ceramics consisting essentially of stabilized high-cristobalite crystals are set forth in Table IV where Mx represents the cation of the metal oxides present with the CaO.

TABLE IV

| Ingredients | Examples (Weight Percent) | | |
|---|---|---|---|
| | 21 | 22 | 23 |
| $SiO_2$ | 88.7 | 86.9 | 88.8 |
| $Al_2O_3$ | 6.4 | 6.3 | 6.4 |
| CaO | 2.3 | 2.3 | 2.8 |
| $ZrO_2$ | 2.6 | — | — |
| PbO | — | 4.5 | — |
| $Fe_2O_3$ | — | — | 2 |
| n | 23.6 | 23.6 | 23.6 |
| CaO/MxO (Molar Ratio) | 2 | 2 | 4 |

Best results are obtained when the CaO/MxO molar ratio is from 4:1 to 1:1 and the amount of $SiO_2$ present is such that $n$ is a positive number of from about 22 to about 29.

When converted to glass-ceramics by the heat-treatments set forth in Table C, the stabilized high-cristobalite products have the phase-assemblages set forth in Table C.

TABLE C

| Ex. No. | Heat Treatment (° C - Hours) | Phase Assemblages (Weight Percentage) | | | |
|---|---|---|---|---|---|
| | | High Cristo-balite | Low Cristo-balite | Feldspar | Glass |
| 21 | 1050 – 48 | 75 | — | — | 25 |
| 21 | 1250 – 48 | 75 | 15 | 10 | 0 |
| 22 | 1050 – 48 | 70 | — | 13 | 17 |
| 22 | 1150 – 48 | 71 | 10 | 14 | 5 |
| 22 | 1250 – 48 | 47 | 26 | 10 | 17 |
| 22 | 1350 – 24 | 35 | 34 | 5 | 26 |
| 23 | 1050 – 48 | 72 | — | — | 28 |
| 23 | 1250 – 48 | 60 | 15 | 10 | 15 |

It will be evident from the above table, as in the other phase assemblage tables, supra, that the amount of the low-cristobalite and feldspar which will be present, if any, will depend upon the composition of the glass and the heat treatment to which it is subjected. As seen in Example 23, above, the difference of 200° C in the crystallization temperature is the difference between no low-cristobalite and no feldspar versus the presence of some of each of these undesirable crystal phases.

While U.S. Pat. No. 3,445,252 teaches that the alkali metal oxides, such as $Na_2O$, $K_2O$, $Rb_2O$ and $Cs_2O$ are preferably absent from the composition since these tend to inhibit the growth of the cristobalite derivatives, it has been found in the present invention that a part of the CaO in the $CaO \cdot Al_2O_3 \cdot nSiO_2$ glass composition may be replaced by a metal oxide $M_2O$, where M is a cation of the first Group of the Periodic Table, which includes, Na, K, Li, Rb and Cs, and a glass-ceramic consisting essentially of stabilized high cristobalite can be formed. Examples of such thermally crystallizable glasses coming within the scope of the invention are set forth in Tables V and VI. Again, in the preferred compositions the $CaO/M_2O$ ratio in preferably from 4:1 to 1:1 and $n$ is a positive number of from 14 to 37.

TABLE V

| Ingredients | Examples (Weight Percent) | | | | | |
|---|---|---|---|---|---|---|
| | 24 | 25 | 26 | 27 | 28 | 29 |
| $SiO_2$ | 83.5 | 87.8 | 89.6 | 91.2 | 89.2 | 93.0 |
| $Al_2O_3$ | 10.1 | 7.5 | 6.4 | 5.4 | 6.4 | 4.3 |
| CaO | 4.5 | 3.3 | 2.8 | 2.4 | 2.4 | 1.9 |
| $K_2O$ | 1.9 | 1.4 | 1.2 | 1 | 2 | 0.8 |
| n | 14 | 19.9 | 23.6 | 28.7 | 23.6 | 36.4 |
| $CaO/K_2O$ (Molar Ratio) | 4 | 4 | 4 | 4 | 2 | 4 |

TABLE VI

| Ingredients | Examples (Weight Percent) | | | | | | |
|---|---|---|---|---|---|---|---|
| | 30 | 31 | 32 | 33 | 34 | 35 | 36 |
| $SiO_2$ | 89.9 | 90.8 | 91.5 | 89.8 | 87.5 | 88.5 | 90.3 |
| $Al_2O_3$ | 6.5 | 5.9 | 5.4 | 6.5 | 6.3 | 6.4 | 6.5 |
| CaO | 2.8 | 2.6 | 2.4 | 1.8 | 2.7 | 2.8 | 2.8 |
| $Na_2O$ | 0.8 | 0.7 | 0.7 | 1.9 | — | — | — |
| $Cs_2O$ | — | — | — | — | 3.5 | — | — |
| $Rb_2O$ | — | — | — | — | — | 2.3 | — |
| $Li_2O$ | — | — | — | — | — | — | 2.4 |
| n | 23.6 | 26 | 28.7 | 23.6 | 23.6 | 23.6 | 23.6 |
| $CaO/M_2O$ (Molar ratio) | 4 | 4 | 4 | 1 | 4 | 4 | 4 |

The glasses of Tables V and VI were subjected to the heat treatments indicated in Table D and the phase assemblages for the stabilized high-cristobalite glass-ceramics which were formed were measured and are set forth in Table D.

When MO is a mixture of CaO and $Na_2O$, $n$ is 21–29 and the molar ratio of CaO to $Na_2O$ at least 1, glass-ceramics having at least 70 weight percent high crystobalite can be made by suitable heat treatment.

TABLE D

| Ex. No. | Heat Treatment (° C - Hours) | Phase Assemblages (Weight Percentage) | | | |
|---|---|---|---|---|---|
| | | High Cristo-balite | Low Cristo-balite | Feldspar | Glass |
| 24 | 1050 – 72 | 48 | — | 34 | 18 |
| 24 | 1150 – 72 | 51 | 5 | 26 | 18 |
| 24 | 1350 – 72 | 23 | 12 | — | 65 |
| 25 | 1050 – 48 | 66 | — | 4 | 30 |
| 25 | 1150 – 96 | 69 | — | 16 | 15 |
| 25 | 1250 – 24 | 59 | 4 | 20 | 17 |
| 25 | 1350 – 24 | 39 | 15 | — | 46 |
| 26 | 1050 – 48 | 58 | — | — | 42 |
| 26 | 1150 – 24 | 80 | — | 10 | 10 |
| 26 | 1250 – 48 | 75 | 12 | — | 13 |
| 27 | 1050 – 48 | 86 | — | — | 14 |
| 27 | 1150 – 48 | 85 | 5 | — | 10 |
| 27 | 1250 – 48 | 77 | 10 | — | 13 |
| 27 | 1350 – 24 | 60 | 25 | 5 | 10 |
| 28 | 1050 – 48 | 59 | — | 8 | 33 |
| 28 | 1150 – 48 | 68 | 7 | 10 | 15 |
| 28 | 1250 – 48 | 63 | 12 | — | 25 |
| 28 | 1350 – 48 | 50 | 19 | — | 31 |
| 29 | 1050 – 48 | 48 | — | — | 52 |
| 29 | 1150 – 48 | 72 | 23 | — | 5 |

TABLE D-continued

| Ex. No. | Heat Treatment (° C - Hours) | Phase Assemblages (Weight Percentage) | | | |
|---|---|---|---|---|---|
| | | High Cristo-balite | Low Cristo-balite | Feldspar | Glass |
| 30 | 1050 – 48 | 86 | — | — | 14 |
| 30 | 1150 – 48 | 91 | — | 7 | 2 |
| 30 | 1250 – 48 | 90 | — | 10 | 0 |
| 30 | 1350 – 24 | 78 | 6 | — | 16 |
| 31 | 1050 – 48 | 95 | — | — | 5 |
| 31 | 1250 – 54 | 82 | — | 13 | 5 |
| 31 | 1350 – 24 | 67 | 8 | — | 25 |
| 32 | 1050 – 48 | 90 | 10 | — | 0 |
| 32 | 1250 – 48 | 63 | 27 | 10 | 0 |
| 33 | 1050 – 48 | 100 | — | — | 0 |
| 33 | 1250 – 48 | 81 | — | 3 | 16 |
| 33 | 1350 – 24 | 59 | 10 | — | 31 |
| 34 | 1050 – 48 | 43 | — | — | 57 |
| 34 | 1250 – 48 | 52 | 5 | 6 | 37 |
| 35 | 1050 – 48 | 68 | — | — | 32 |
| 35 | 1250 – 48 | 61 | 12 | — | 27 |
| 36 | 1050 – 48 | 94 | — | 4 | 2 |
| 36 | 1250 – 54 | 71 | 8 | 16 | 5 |

Stabilized high-cristobalite glass-ceramics of the foregoing Tables made in accordance with the above procedure can be heated to temperatures of up to about 1250° C and held there indefinitely without any change occurring in the crystal structure. When cooled down to below 200°–275° C there is no inversion of the stabilized high-cristobalite to low-cristobalite so that refractory brick made from the compositions of the invention disclosed above, will not crack or spall as it is cooled to ambient temperature.

Coefficients of thermal expansion for representative examples of stabilized high-cristobalite glass-ceramics of the invention are as follows:

TABLE E

| Example No. | Heat Treatment (° C-Hours) | $\alpha \times 10^7/°$ C | |
|---|---|---|---|
| | | 0–300° C | 0–700° C |
| 1 | 1050-48 | 113.4 | 77.6 |
| 1 | 1250-48 | 166 | 100.2 |
| 4 | 1050-48 | 116.6 | 79.6 |
| 4 | 1250-48 | 141.9 | 88.5 |
| 11 | 1050-48 | 211.3 | 120.2 |
| 14 | 1050-48 | 126.8 | 82.6 |
| 17 | 1050-48 | 106.5 | 74.1 |
| 24 | 1050-72 | 95 | 66.5 |
| 26 | 1030-48 | 74.4 | 56.9 |
| 27 | 1050-48 | 113.4 | 83.4 |
| 27 | 1150-48 | 176 | 104.3 |
| 30 | 1050-48 | 118 | 83.2 |
| 30 | 1250-48 | 177.1 | 107.4 |
| 31 | 1050-48 | 115.9 | 80.6 |
| 31 | 1250-48 | 143.2 | 90.8 |
| 33 | 1050-48 | 127.3 | 89.9 |
| 33 | 1250-48 | 169.5 | 103.8 |

Refractory bricks coming within the scope of the invention can readily be made. The thermally crystallizable glass is fritted or ground into powder and a binder, such as Neocryl or Carbowax, is added thereto in an amount sufficient to hold the glass particles into whatever shape they are pressed, such as in the form of a brick or other desirable shape. The binder is burned off or volatilizes when the pressed and shaped glass bodies are subjected to a temperature of about 600° F for 1 hour. Of course, the temperature and time will be determined by the particular binder which is used. The shaped brick or body is then heat-treated at sufficient high temperature between the annealing and the solidus temperature, for a period of time necessary to form the stabilized high-cristobalite solid solution from the glass.

A stabilized high-cristobalite solid solution brick may also be prepared by the sintering method similar to the one for preparing normal silica brick. Knowing the composition of the thermally crystallizable glass, it will be within the skill of one in the art, from a reading of the invention as described above, to ascertain the temperatures and times needed to form a refractory brick consisting essentially of a predominant stabilized high-cristobalite solid solution.

From the foregoing description those skilled in the art can readily practice the invention to form a glass-ceramic article, such as refractory linings for ovens, furnaces and the like, having stabilized high-cristobalite solid solution as essentially the sole crystalline phase. While traces or very small amounts of other phases such as feldspar, and low-cristobalite may also be present in such glass-ceramic, the stabilized high-cristobalite phase is the predominant one since substantially all of the crystalline phase is of this material. The presence of any other crystalline phases are in amounts so small that they will not affect the basic characteristics of the stabilized high-cristobalite glass-ceramic article.

What is claimed is:

1. A glass crystallizable to a glass-ceramic having stabilized high-cristobalite solid solution crystal phase formed by thermal in situ crystallization, said glass consisting essentially of the composition $MO \cdot Al_2O_3 \cdot nSiO_2$ wherein the ($Al_2O_3$/MO) molar ratio is 1 and MO is a member of the group consisting of CaO and a mixture of CaO and a metal oxide wherein the metal is a cation selected from iron and the first, second and fourth groups of the Periodic Table and the molar ratio of CaO to said metal oxide is from 4:1 to 1:3 and $n$ is a positive number of from 8 to 37.

2. A glass of claim 1 wherein $n$ is at least 14.

3. A glass of claim 2 wherein $n$ is from 21 to 29.

4. A glass of claim 1 wherein MO is CaO.

5. A glass of claim 2 wherein MO is a mixture and said metal oxide is $Na_2O$.

6. A glass of claim 2 wherein MO is a mixture and said metal oxide is $K_2O$.

7. A glass of claim 2 wherein MO is a mixture and said metal oxide is $Cs_2O$.

8. A glass of claim 2 wherein MO is a mixture and said metal oxide is $Rb_2O$.

9. A glass of claim 2 wherein MO is a mixture and said metal oxide is $Li_2O$.

10. A glass of claim 1 wherein said ratio of CaO to said metal oxide is at least 1:1.

11. A glass of claim 1, wherein MO is a mixture of CaO and $Na_2O$, $n$ is 21–29 and the ratio of CaO to $Na_2O$ is at least 1.

12. A glass consisting essentially of the composition $CaO \cdot Al_2O_3 \cdot nSiO_2$ wherein $n$ is a positive number of from 21 to 29.

13. A glass of claim 2 wherein MO is a mixture and said metal oxide is an alkali metal oxide.

* * * * *